United States Patent
Baubeau et al.

(10) Patent No.: US 11,045,907 B2
(45) Date of Patent: Jun. 29, 2021

(54) SYSTEM AND METHOD FOR ADDITIVELY MANUFACTURING BY LASER MELTING OF A POWDER BED

(71) Applicants: Manutech-USD, Saint-Etienne (FR); Ecole Nationale d'Ingenieurs de Saint-Etienne, Saint-Etienne (FR); Ecole Centrale de Lyon, Ecully (FR); Centre National de la Recherche Scientifique (C.N.R.S.), Paris (FR)

(72) Inventors: Emmanuel Baubeau, Saint Etienne (FR); Florent Missemer, Saint-Etienne (FR); Philippe Bertrand, Boisset les Montrond (FR)

(73) Assignees: Manutech-USD; Ecole Nationale d'Ingenieurs de Saint-Etienne; Ecole Centrale de Lyon; Centre National de la Recherche Scientifique

( * ) Notice: Subject to any disclaimer, the term of this patent is extended or adjusted under 35 U.S.C. 154(b) by 359 days.

(21) Appl. No.: 15/762,482

(22) PCT Filed: Sep. 22, 2016

(86) PCT No.: PCT/FR2016/052401
§ 371 (c)(1),
(2) Date: Mar. 22, 2018

(87) PCT Pub. No.: WO2017/051123
PCT Pub. Date: Mar. 30, 2017

(65) Prior Publication Data
US 2018/0272473 A1    Sep. 27, 2018

(30) Foreign Application Priority Data
Sep. 23, 2015    (FR) ........................................ 1558976

(51) Int. Cl.
*B33Y 10/00*        (2015.01)
*B33Y 30/00*        (2015.01)
(Continued)

(52) U.S. Cl.
CPC ............ *B23K 26/354* (2015.10); *B23K 26/34* (2013.01); *B28B 1/001* (2013.01); *B29C 64/153* (2017.08);
(Continued)

(58) Field of Classification Search
CPC ..... B29C 64/20; B29C 64/153; B23K 26/354; B33Y 30/00
See application file for complete search history.

(56) References Cited

U.S. PATENT DOCUMENTS

2004/0223202 A1\*  11/2004  Lippert .................. G02B 26/08
                                                359/204.1
2009/0079941 A1\*   3/2009  Miller .................. H04N 13/363
                                                    353/8
(Continued)

FOREIGN PATENT DOCUMENTS

DE    102012219196     2/2014
WO    WO2014207751    12/2014
(Continued)

OTHER PUBLICATIONS

RP Photonics Encyclopedia (Year: 2006).\*

*Primary Examiner* — Nahida Sultana
*Assistant Examiner* — Debjani Roy
(74) *Attorney, Agent, or Firm* — Forge IP, PLLC

(57) ABSTRACT

A system of additive-manufacturing by laser melting of a powder bed. The system includes a first laser unit selectively emitting a first laser beam to form at least one layer of material by melting the powder bed; a second laser unit selectively emitting a second laser beam to machine at least (Continued)

a portion of the layer of material; and an optical unit enabling to focus the first laser beam on the powder bed to be melted and the second laser beam on the layer of material to be machined. The system is able to produce a part by successive stacking of melted then machined layers of material. A process of additive-manufacturing by laser melting of a powder bed is also contemplated.

7 Claims, 2 Drawing Sheets

(51) Int. Cl.
| | |
|---|---|
| *B33Y 40/00* | (2020.01) |
| *B29C 64/153* | (2017.01) |
| *B23K 26/354* | (2014.01) |
| *B29C 64/30* | (2017.01) |
| *B23K 26/34* | (2014.01) |
| *B28B 1/00* | (2006.01) |

(52) U.S. Cl.
CPC .............. *B29C 64/30* (2017.08); *B33Y 10/00* (2014.12); *B33Y 30/00* (2014.12); *B33Y 40/00* (2014.12)

(56) References Cited

U.S. PATENT DOCUMENTS

| | | | | |
|---|---|---|---|---|
| 2010/0044547 | A1* | 2/2010 | Higashi | B33Y 40/00 249/79 |
| 2015/0224600 | A1 | 8/2015 | Spiess et al. | |
| 2016/0311027 | A1* | 10/2016 | Shimoyama | B33Y 10/00 |
| 2017/0190113 | A1* | 7/2017 | Calefati | B29C 64/20 |

FOREIGN PATENT DOCUMENTS

| | | |
|---|---|---|
| WO | WO2015012992 | 1/2015 |
| WO | WO2015181772 | 12/2015 |

* cited by examiner

SYSTEM AND METHOD FOR ADDITIVELY MANUFACTURING BY LASER MELTING OF A POWDER BED

TECHNICAL FIELD OF THE INVENTION

The present invention concerns a system and a process of additive-manufacturing by laser melting of a powder bed. The field of the invention is that of additive-manufacturing processes by laser melting of a powder bed, of the laser beam melting (LBM), selective laser melting (SLM) or selective laser sintering (SLS) type.

BACKGROUND OF THE INVENTION

In practice, the geometric precision and surface condition of parts manufactured by implementing these processes are limited by the grain size of the powders used, the thickness of the layers of powder melted and hardened (on the order of a few grains of powder) and by the precision of producing the weld bead between grains. These limitations are slowing the development of these processes.

Frequently, a rework operation is necessary to obtain a functional part. Known reworking techniques include machining by cutting tool, sandblasting, electrolytic etching, sanding, polishing, etc. However, such operations take time and represent extra cost. Moreover, such operations are sometimes impossible to carry out, for example on the internal surfaces of parts.

WO 2015/012992 describes different embodiments of a system and process of additive-manufacturing by spraying material into the nexus of a laser beam, and not by laser melting of a powder bed. The system comprises two laser units, each provided with its own optical unit, such that the beams are focused following different optical paths. Such a system is not designed for the laser melting of a powder bed. Furthermore, it has a complex structure and lacks precision in machining.

WO 2015/181772 discloses different embodiments of a system and process of additive-manufacturing by spraying and melting powder. According to a first embodiment, the process consists of spraying the powder into the nexus of a laser beam, as mentioned above. According to a second embodiment, the process consists of spraying the powder as a sequence of adjacent circles of powder, which are partially melted turn by turn by the laser beam. Such a system is not designed for the laser melting of a powder bed.

SUMMARY OF THE INVENTION

The purpose of the present invention is to propose a system and a process of additive-manufacturing to remedy the aforementioned disadvantages.

To that end, an object of the invention is a system of additive-manufacturing by laser melting of a powder bed, characterized in that the system comprises: a first laser unit selectively emitting a first laser beam to form at least one layer of material by melting the powder bed; a second laser unit selectively emitting a second laser beam to machine at least a portion of said layer of material; and an optical unit enabling to focus the first laser beam on the powder bed to be melted and the second laser beam on the layer of material to be machined. The system is able to produce a part by successive stacking of melted then machined layers of material.

Thus, the invention enable to improve the geometric precision and the surface condition of the part produced.

Once formed by the action of the first laser unit, by melting then hardening of the powder bed, each layer of material can be machined in-situ by the action of the second laser unit. Said laser machining is selective, that is, each layer of material formed can be selectively machined or not, depending on the characteristics of the part to be produced. In the final portion, the optical path of the machining beam is combined with the optical path of the melting beam, which achieves great precision in the machining and simplifies the architecture of the system.

According to other advantageous characteristics of the system according to the invention, taken in isolation or in combination:
  The powder is a plastic, ceramic or metallic material.
  The first laser unit comprises a continuous laser source.
  The second laser unit comprises a pulsed laser source.
  The pulsed laser source produces pulses of a duration on the order of a few femtoseconds to a few tens of picoseconds.
  The pulsed laser source produces pulses having a duration comprised between 300 and 900 femtoseconds.
  The optical unit comprises a biaxial scanner and a focusing lens.
  The system also comprises movable guiding means for guiding the laser beams, configured to selectively guide the first laser beam or the second laser beam to the optical unit.

An object of the invention is also a process of additive-manufacturing by laser melting of a powder bed. The process is characterized in that it comprises alternately:
  a) a formation step consisting of forming at least one layer of material by melting a powder bed under the action of a first laser beam; and
  b) a machining step consisting of machining at least a portion of said layer of material under the action of a second laser beam; so as to produce a part by successive stacking of melted then machined layers of material.

According to other advantageous characteristics of the process according to the invention, taken in isolation or in combination:
  In the formation step, the first laser beam is generated by a first laser unit comprising a continuous laser source.
  In the machining step, the second laser beam is generated by a second laser unit comprising a pulsed laser source.
  In at least one machining step during the process, the second laser beam is used to produce texturing or surface functionalization of the part.
  During the last machining step of the process, the second laser beam is used to produce surface texturing or functionalization of the
  In the formation step and the machining step, the laser beams are focused by a single optical unit on the powder bed to be melted or on the layer of material to be machined.
  Between the formation step and the machining step, movable guiding means are moved upstream of the optical unit, in the common optical path of the beams, to enable the beams emitted from the two laser units to be oriented towards the part through the scanner.

BRIEF DESCRIPTION OF THE DRAWINGS

The invention will be better understood upon reading the following description, given solely as a non-limiting example, and made with reference to the accompanying figures wherein.

DETAILED DESCRIPTION OF SOME EMBODIMENTS

Figure 1:
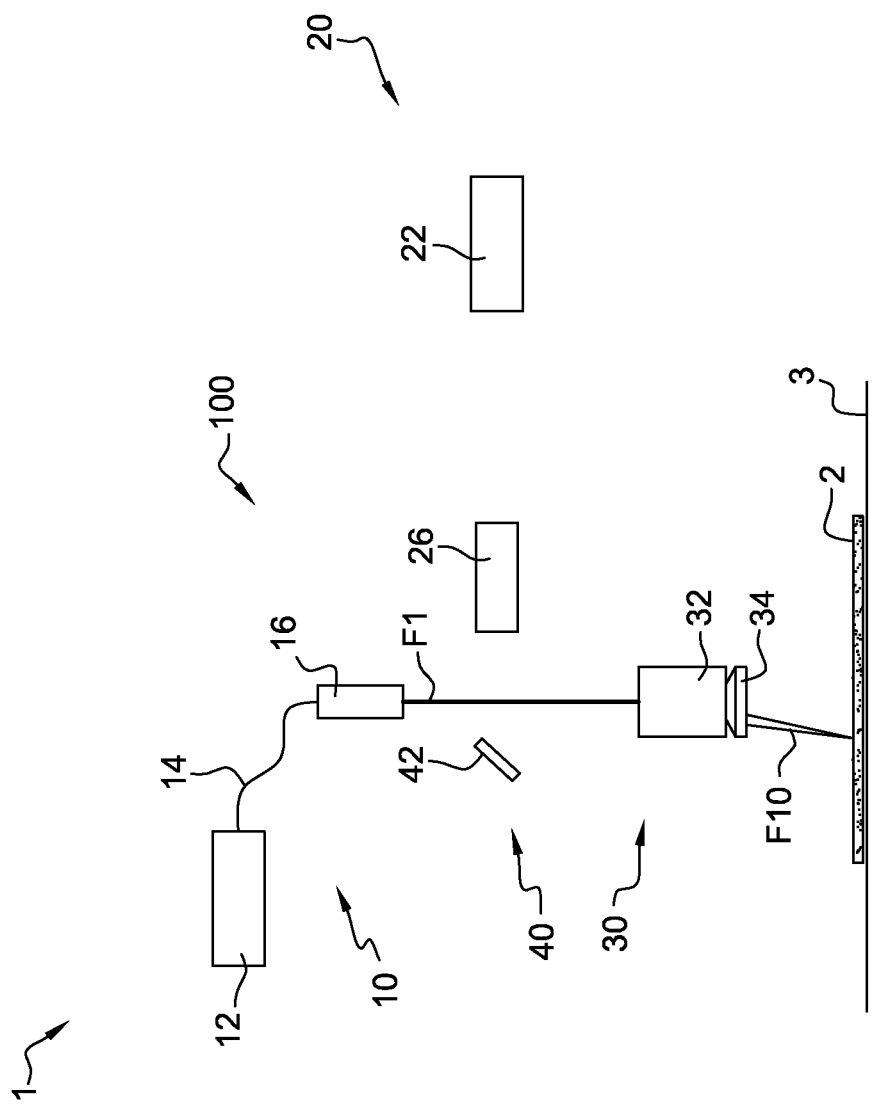
FIG. 1 is a schematic representation of an additive-manufacturing system according to the invention, illustrating a first step of an additive-manufacturing process also according to the invention.
Figure 2:
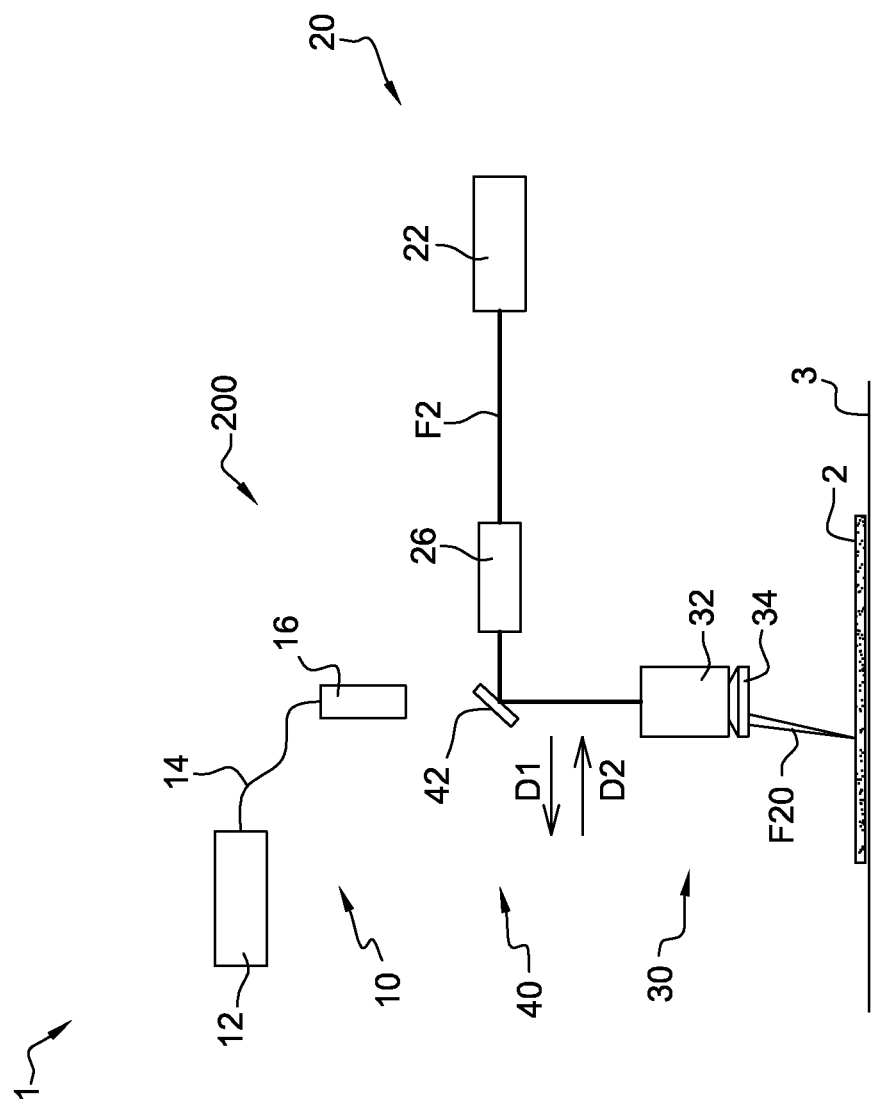
FIG. 2 is a schematic representation of the system, illustrating a second step of the process.

Represented in FIGS. 1 and 2 is an additive-manufacturing system 1, enabling a part to be produced by laser melting of a powder bed 2.

The system 1 comprises two laser units 10 and 20, an optical unit 30 and a guiding mechanism 40. The system 1 also comprises a device for depositing the powder bed 2 onto a substrate 3, said device not being represented for purposes of simplification. Advantageously, the elements comprising the system 1 can be integrated into a single machine, having a relatively simple and compact architecture.

The first laser unit 10 comprises a continuous laser source 12 connected by an optical fiber 14 to a first afocal enlarging device 16, which forms a collimator. The laser unit 10 is designed to selectively generate a laser beam F1 for melting the powder bed 2.

The second laser beam 20 comprises a pulsed laser source 22, associated with a second afocal enlarging device 26, which forms a collimator. The laser unit 20 is designed to selectively generate a laser beam F2 for machining a bed of material obtained previously by melting the powder bed 2 with the laser unit 10. According to a particular embodiment, the laser unit 20 is designed to produce surface texturing or functionalization of the part. Said surface functionalization can for example make it possible to provide hydrophobic properties in the interior of the part or on the surface, by the creation of nanostructures. The source 22 produces ultra-short pulses (of a duration on the order of a few femtoseconds to several tens of picoseconds) and having a high peak power (several tens to several hundreds of microJoules). Preferably, the pulses have a duration of between 300 and 900 femtoseconds. An advantage of the femtosecond laser is that it has very little thermal effect on the materials, and that it is able to produce micrometric patterning.

The optical unit 30 comprises a biaxial scanner 32 coupled to a focusing lens 34. The optical unit 30 is designed to selectively direct the laser beam F1 or F2 received upstream by the scanner 32, to a precise point of the powder bed 2 or of the layer of material obtained by melting the powder bed 2, in the form of a laser beam F10 or F20 focused downstream by the lens 34. In other words, the same optical unit 30 enables the laser beams F10 and F20 to be focused alternately on the powder bed 2 to be melted and on the layer of material to be machined.

The guiding mechanism 40 is provided to guide the laser beam F2 emitted by the laser unit 20 to the optical unit 30. In the example of FIGS. 1 and 2, the guiding mechanism 40 comprises a mirror 42 movable in translation along two opposite directions D1 and D2. More specifically, the mirror 42 is movable in the area situated between the scanner 32 and the devices 16 and 26, in order to move away from the path of the beam F1 and be positioned in the path of the beam F2.

Preferably, the sources 12 and 22 are selected so that the laser beams F1 and F2 have wavelengths that are close. Thus, the treatments applied to the optical elements of the scanner 32 and of the lens 34 are suitable for both beams F1 and F2. For example, each of the beams F1 and F2 has a wavelength of between 1030 nm and 1080 nm.

When the beams F1 and F2 have wavelengths far from each other, the optical elements of the scanner 32 and of the lens 34 are specifically treated for both wavelengths. In this case, the guiding mechanism 40 can include a fixed dichroic plate. For example, the beam F1 can have a wavelength of between 1060 nm and 1080 nm while the beam F2 has a wavelength of between 800 nm and 1030 nm.

The additive-manufacturing process according to the invention consists of a sequence comprising alternating steps 100 and 200, as detailed below.

First, the powder bed 2 is deposited on the substrate 3. Preferably, a powder bed is uniformly spread onto the substrate 3. Alternatively, the powder bed can be spread onto the substrate 3 with a variable thickness.

The step 100 shown in FIG. 1 consists of forming a layer of material by melting the powder bed 2 deposited on the substrate 3. The laser unit 10 emits the continuous laser beam F1, which is collimated at the appropriate diameter by the device 16 and transmitted to the optical unit 30. The beam F1 is diverted by the scanner 32 in front of the focusing lens 34. The optical unit 30 directs the focused laser beam F10 onto the powder bed 2 and melts the grains to form one or more layers of material, following the path defined for constructing the part. The unmelted powder surrounding this part can be used for support, both for the part and for the subsequent layers of powder.

Step 200 shown in FIG. 2 consists of machining at least a portion of the last layer of material formed during step 100. At the beginning of step 200, the mirror 42 is positioned in the optical path of the beam F2 by translation along the direction F2. The laser unit 20 emits the laser beam F2, which is collimated at the appropriate diameter by the device 26 and diverted by the mirror 42 towards the optical unit 30. The positioning of the mirror 42 enables the beam F2 to be sent along the same optical path as the beam F1. The beam F2 is diverted by the scanner 32 in front of the focusing lens 34. The optical unit 30 directs the laser beam F20 focused on the layer of material to be machined, traveling over the contour or the area to be machined. Thus, the step 200 enable to obtain a clean cut of the layer of material, following the path defined for constructing the part. According to a particular embodiment, the step 200 consists of texturing or functionalizing the surface of the part. At the end of step 200, the mirror 42 is removed from the optical path of the beam F1 by translation along the direction D1.

Steps 100 and 200 are repeated alternately as many times as necessary to produce the complete part. Before each step 100, one or more layers are deposited forming a powder bed 2 on the last layer of material obtained upon completion of step 200.

Advantageously, the sequence of steps 100 and 200 comprising the process can be achieved by implementing the system 1.

In practice, the system 1 can be adapted differently from FIGS. 1 and 2 without going beyond the scope of the invention.

As a variant (not shown), the source 22 can be connected to the device 26 by an optical fiber.

According to another variant (not shown), the guiding mechanism 40 can be different from a mirror 42 movable in translation. For example, the mechanism 40 can comprise a mirror 42 that is rotatable. According to another example, the mechanism 40 can comprise a set of mirrors, including at least one fixed mirror and at least one movable mirror.

According to another example, the mechanism 40 can be configured to be moved away from the path of the beam F2 and to be positioned in the path of the beam F1. In another example, in the case where the laser sources 12 and 22 are polarized, the guiding mechanism 40 can comprise a polarizing cube. According to another example mentioned above, in the case where the beams F1 and F2 have wavelengths far from each other, the guiding mechanism 40 can comprise a fixed dichroic plate.

Additionally, the technical characteristics of the various embodiments and variants mentioned above can be, in whole or for some of them, combined with each other. Thus, the system 1 can be adapted in terms of cost, functionalities and performance.

The invention claimed is:

1. A system of additive-manufacturing by laser melting of a powder bed, wherein the system comprises:
   a first laser unit selectively emitting a first laser beam to form at least one layer of material by melting the powder bed;
   a second laser unit selectively emitting a second laser beam to machine at least a portion of said layer of material; and
   a single optical unit enabling to focus the first laser beam on the powder bed to be melted and the second laser beam on the layer of material to be machined;
   wherein the system is configured to produce a part by successive stacking of melted then machined layers of material; and
   wherein the system is configured to combine the optical path of the first laser beam and the optical path of the second laser beam in a final portion.

2. The system according to claim 1, wherein the first laser unit comprises a continuous laser source.

3. The system according to claim 1, wherein the second laser unit comprises a pulsed laser source.

4. The system according to claim 3, wherein the pulsed laser source produces pulses of a duration on the order of a few femtoseconds to a few tens of picoseconds.

5. The system according to claim 3, wherein the pulsed laser source produces pulses having a duration between 300 and 900 femtoseconds.

6. The system according to claim 1, wherein the optical unit comprises a biaxial scanner and a focusing lens.

7. The system according to claim 1, wherein the system also comprises movable guiding mechanism configured to selectively guiding the first laser beam or the second laser beam to the optical unit.

* * * * *